Feb. 15, 1966   H. A. MILHAUPT   3,235,101
SEMI-AUTOMATIC TRANSFERRING APPARATUS
Filed Oct. 16, 1962   2 Sheets-Sheet 1

INVENTOR.
HOWARD A. MILHAUPT
BY
Andrus & Starke
ATTORNEYS

Feb. 15, 1966  H. A. MILHAUPT  3,235,101
SEMI-AUTOMATIC TRANSFERRING APPARATUS
Filed Oct. 16, 1962  2 Sheets-Sheet 2
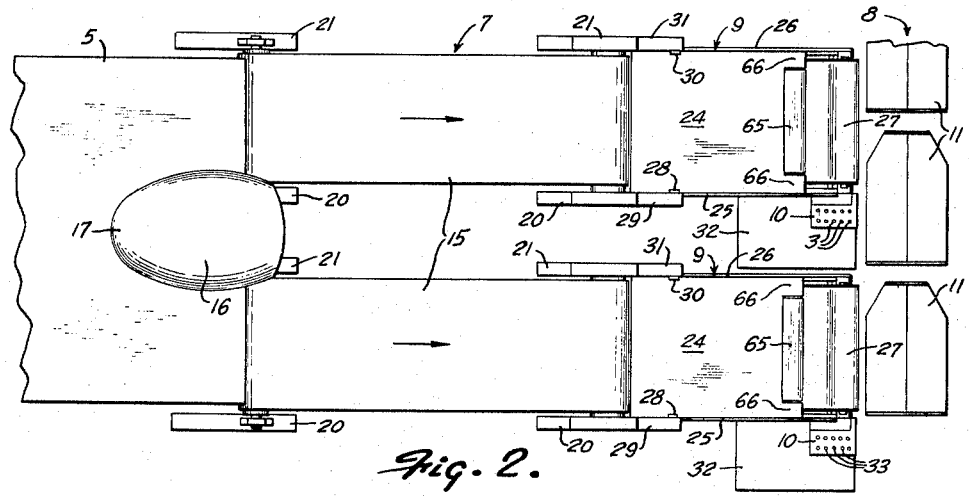
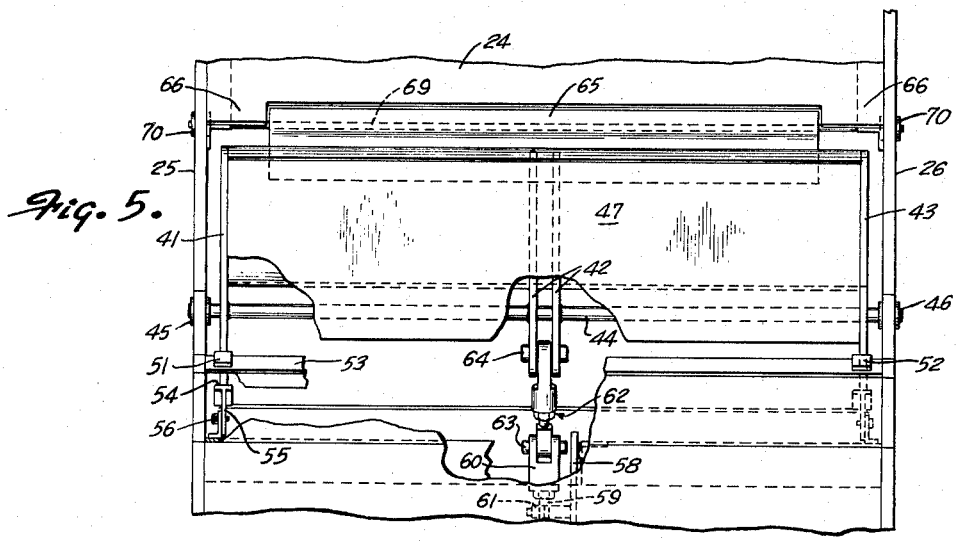
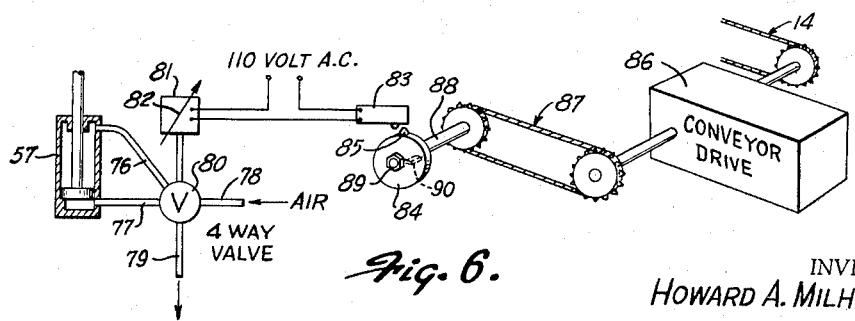
INVENTOR.
HOWARD A. MILHAUPT
BY
Andrus & Starke
ATTORNEYS

United States Patent Office 3,235,101
Patented Feb. 15, 1966

3,235,101
SEMI-AUTOMATIC TRANSFERRING APPARATUS
Howard A. Milhaupt, Fox Point, Wis., assignor to Speaker Sortation Systems, Inc., Brookfield, Wis., a corporation of Wisconsin
Filed Oct. 16, 1962, Ser. No. 230,857
5 Claims. (Cl. 214—11)

This invention relates to a semi-automatic transferring apparatus and particularly to a system wherein a plurality of articles are sequentially fed to a loading or induction station or the like and then transferred to an automatic sorting conveyor for proper classification or separation and more particularly to an improved induction station for loading of the sorter from a plurality of adjacent induction stations.

In the sorting of a large number of articles into various classifications, automatic conveying means have been employed for carrying the articles to the respective unloading stations for the several classifications. For example, United States Patent 3,034,665 to R. L. Speaker discloses a high speed pivoting tray conveyor or sorter in which the operator keys the tilting of the trays in accordance with predetermined alignment with selected unloading stations.

Automatic or semi-automatic means for loading of the trays of the conveyor and keying of the conveyor is desirable for efficient operation and maximum conveyor speeds. Where the articles are relatively heavy such as the conventional filled mail bag, the rapid loading of the sorter required for high speed sorting becomes particularly difficult because of the bulk and the weight of the bags.

It has been proposed in the sorting of articles and commodities that a plurality of induction or loading stations be provided for loading of the sorter such that the sorter operates at a relatively high speed while the loading at the several loading stations is at a relatively low speed and only in the aggregate corresponds to the time of the sorter. The sorter is generally subdivided into adjacent transporting groups each of which includes spaced portions assigned to each of the several loading stations. The corresponding portion of the sorter is keyed at the respective loading station. Indicating means, such as color coding or an indicating buzzer, light or the like, may be provided to indicate when a proper portion of the sorter is aligned with the corresponding loading station.

The induction stations include a common feed system with adjacent chutes or a continuous storage chute and the like directing the commodities into the individual induction or loading apparatus. For example, in sorting of mail bags in the post offices, a continuous storage chute may span the inlet end of a plurality of induction stations with diverting means for directing the mail bags into the several stations. Difficulties have been encountered in maintaining a continuous feed from the chute into the loading stations as a result of jamming in the discharge end of an individual chute.

The present invention is particularly directed to an improved construction of an induction or loading apparatus. The induction apparatus is mounted with a long storage chute having diverting means for uniform loading to eliminate jamming of the articles or mail bags within the chutes. In accordance with the present invention, induction stations are arranged in side-by-side slightly spaced relation in accordance with more or less conventional practice. Each station includes a transfer or loading apparatus including a feed belt for picking up the individual articles from an aligned surge and storage chute and delivering them in sequence to an orienting and destination reading table.

In accordance with an important aspect of the present invention particularly when applied to sorting of mail bags, a bull-nosed diverting surface or plate having a parabolic vertical cross-section and an elliptical horizontal cross-section is secured between the entrance end of the belt to divert the bags into the adjacent belts. It has been found that this cross-sectional construction diverts the bags without jamming of the bags within the base of the chute which has heretofore prevented movement of a bag onto the feed belt.

The feed belt separates and delivers the articles onto the upper end of a downwardly slanted orienting table. Control means are provided for stopping the movement of the belt when the mail bag is at the top of the orienting table and to again start the belt when the bag has moved down the table indicating the readiness to receive a subsequent article.

In accordance with the present invention, the orienting table is inclined downwardly whereby the article of average weight has a slight tendency to slide down the table under its own weight. The article is then essentially balanced on the table and can be pulled downwardly with a very minimum of effort and in the event it tends to move under its own weight, can be held back with a very minimum of effort. The operator may thus determine the necessary destination information for subsequent operations without expending a great effort in properly positioning or moving the article on the orienting table. Where various types of articles are to be sorted, means are provided varying the angle of the orienting table and thereby adjusting for the friction coefficient of the articles being sorted. For example, the angle of the table will be less for cartons than for mail bags. The loading operator can readily determine the optimum positioning of the table angle by trial and error or such information can be predetermined and appropriate instructions given to the operators.

Generally, applicant has found that for mail bags and other generally similar articles, a table formed of stainless steel or the like is preferably set at an angle between 9 and 12 degrees. The angle may however vary from this range depending on the article and the surface condition of the table.

In accordance with another very important aspect of the present invention, a discharge gate member is mounted at the terminal end of the orienting table to receive the articles which slide off the end of the orienting table. The discharge gate is preferably in the form of a tilting or pivoting discharge bucket which is automatically tilted to a discharge position when a proper portion of the main sorter is in proper relative alignment with the gate. The pivoting discharge bucket provides a positive thrust in discharging the article onto the sorter. The thrust force can be conveniently varied by adjusting the pivoting speed of the bucket. Where such positive action is not necessary, any other suitable discharge gate can be employed within the broadest scope of this invention. The movement of the discharge gate is automatically interlocked with the movement of the sorter and controlled by the main sorter control to properly pivot the discharge gate to a discharge position in timed relation to the movement of the sorter for delivering an article to the proper portion thereof. A barrier guard or stop is provided on the discharge end of the orienting table and interlocked with the movement of the discharge gate. The stop is positioned during the discharge movement of the discharge gate to prevent a subsequent article from being moved into the discharge gate mechanism until it returns to the loading position.

The present invention thus provides an induction apparatus constructed for rapid loading of high speed sorters and conveyors with means to maintain an even flow of the bags or articles and to allow operation with a minimum of effort and skill.

The drawings furnished herewith illustrate the best mode presently contemplated for carrying out the invention.

In the drawings:

FIG. 1 is a diagrammatic illustration of an induction station for sorting of mail bags or the like;

FIG. 2 is a fragmentary plan view of a sorting system incorporating the present invention;

FIG. 5 is a front elevational view of the orienting table shown in FIGS. 3 and 4; and FIG. 6 is a schematic circuit and diagrammatic illustration of a control system interlocking the movement of a discharging bucket forming a part of the induction station with the movement of the sorter.

Figure 1:
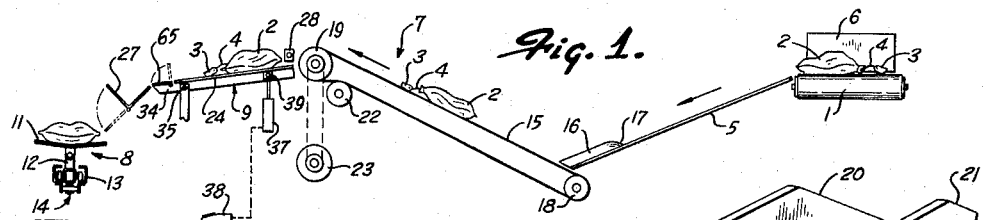

Referring to the drawings and particularly to FIGS. 1 and 2, the present invention is illustrated in a mail bag delivery and sorting system for purposes of describing one specific embodiment of the present invention. The illustrated system includes an incoming feed belt 1 upon which a plurality of mail bags 2 is carried in a random and unsorted grouping. Each of the bags 2 includes an identification tag 3 secured to the end of a bag closing rope 4 and carrying destination information thereon. The incoming feed belt 1 carries the bags in a random manner to a continuous storage chute 5 which extends parallel to the belt 1 and which is inclined downwardly from the feed belt 1. A suitable diverter 6 moves across the belt 1 to distribute the mail bags 2 onto the chute 5. Chute 5 directs the mail bags 2 to a pair of loading stations or devices 7 which are arranged in side-by-side parallel relation between the storage chute 5 and an automatic sorting conveyor 8. A pair of loading devices are shown for illustrative purposes although more may be employed.

Each loading device 7 operates similarly to deliver the mail bags 2 to the sorting conveyor 8 under the control of an operator, not shown, as hereinafter described. The conveyor 8 is preset through an automatic control system to deliver the bags 2 to a plurality of unloading stations, not shown, each of which is related to the various classifications carried by the identification tag 3. Each loading device 7 includes an orienting table assembly 9 at the discharge end thereof at which the operator, not shown, reads the identification tag 3 and through operation of a keyboard 10 determines at which of the plurality of unloading stations the particular mail bag 2 is to be discharged.

The illustrated sorting conveyor 8, of which only a portion is shown, is a tilting tray unit and preferably corresponds to that shown in the previously referred to Speaker Patent 3,023,665. The illustrated conveyor 8 includes a train of trays 11 which are individually pivotally releasably secured in a horizontal transporting position by a suitable supporting truck 12 which moves in a track 13. A chain drive 14 or other suitable means is connected to the trucks 12 and move the trays 11 in endless path past a plurality of unloading stations, not shown. Means at the unloading stations are provided for tilting of an aligned tray to a laterally inclined discharge position and discharging of a bag 2 from the corresponding tray 11.

In the illustrated embodiment of the invention, the trays 11 are paired with the two loading devices 7 such that alternate trays are automatically loaded from each of the loading devices 7 as hereinafter described.

Each loading device 7 is similarly constructed and includes an upwardly inclined power driven induction belt 15 which has the lower end disposed immediately beneath a portion of storage chute 5 and terminates at and above the upper end of table assembly 9. Belt 15 picks up bags 2 from chute 5 in succession and transfers them to assembly 9. The inclination of the induction belt 15 is determined by the allowable floor space and the dimensions of the building within which the system is mounted.

The storage chute 5 is generally of a conventional construction and is inclined downwardly from the incoming feed belt 1 for directing the mail bags 2 downwardly toward the corresponding induction belt 15.

A bull-nose diverter or separator 16 forming one feature of the invention interconnects or overlies the lower end of the storage chute 5 between the loading devices 7. The bull-nose separator 16 is generally parabolic in cross section and includes a narrow end of lesser width than the spacing between the loading devices 7. The forward end of the separator 16 is spaced upwardly from the discharge ends of the chutes 5 and nose 17 is a hyperbolic curve with the opposite edges tapering laterally outwardly beyond the vertical plane of the edges of the belts 15 and then inwardly in a slight overlap of the pick-up end of the belts. It has been found that this construction prevents jamming of the mail bags in the bottom end of the chute and maintains continuous transfer of the bags to the belts 15 and movement to assembly 9.

The power driven induction belt 15 is an endless flat belt supported by lower and upper belt rolls 18 and 19 which are rotatably secured to a pair of side wall structures 20 and 21 of a suitable supporting framework. An idler roll 22 is provided bearing on the undersurface of the belt 15 to maintain the desired tension in the belt. A drive motor 23 is mounted between the side wall structures 20 and 21 and coupled to the upper drive belt roll 19 for moving thereof in an endless loop and transferring of the mail bags in succession upwardly to the table assembly 9. The side wall structures 20 and 21 project above the level of belt 15 to prevent the bags 2 from moving laterally off the belt. As the bags 2 move over the upper end of the belt 15, they drop onto the upper end of the orienting table assembly 9 which is arranged immediately adjacent the discharge end of the belt.

The orienting table assembly 9 includes an orienting table 24 supported by suitable side walls 25 and 26. Table 24 slants downwardly from the discharge end of the belt 15 and terminates adjacent a power operated discharge bucket 27. The mail bags 2 are slid directly from the orienting table 24 into the bucket 27 before or after proper keying of conveyor 8 by operation of keyboard 10 for automatic destination discharge of conveyor 8.

A photoelectric cell is secured by a suitable box-like support 29 to the wall structure 20 adjacent the belt 15 and is disposed immediately above the upper end of the orienting table 24. An energizing lamp 30 is similarly secured by a support 31 to the opposite wall structure 21 in alignment with the cell 28. The photoelectric cell 28 is interconnected with the drive circuit of the motor 23 through a suitable control circuit, not shown, to stop further operation of the induction belt 15 whenever a bag 2 is resting on the upper end of orienting table 24 and in the path of the light from the lamp 30.

A platform 32 is provided adjacent the one side of the orienting table assembly 9 at a position for convenient manual handling of the bags 2 on table 24. The keyboard 10 is mounted on the platform 32 and includes a plurality of designation keys 33 each related to a particular unloading station. Depressing of a key 30 establishes a control circuit, not shown, for the next related tray 11 to which the bag 3 being keyed is transferred by the bucket 27. The control circuit may be of any suitable construction such as described in the previously referred to Speaker patent and no further description thereof is given.

Although the mail bags 2 are delivered directly to the slanting table 24, the tendency to move down is controlled by the angle of the table for optimum manual control thereof.

Figure 4:
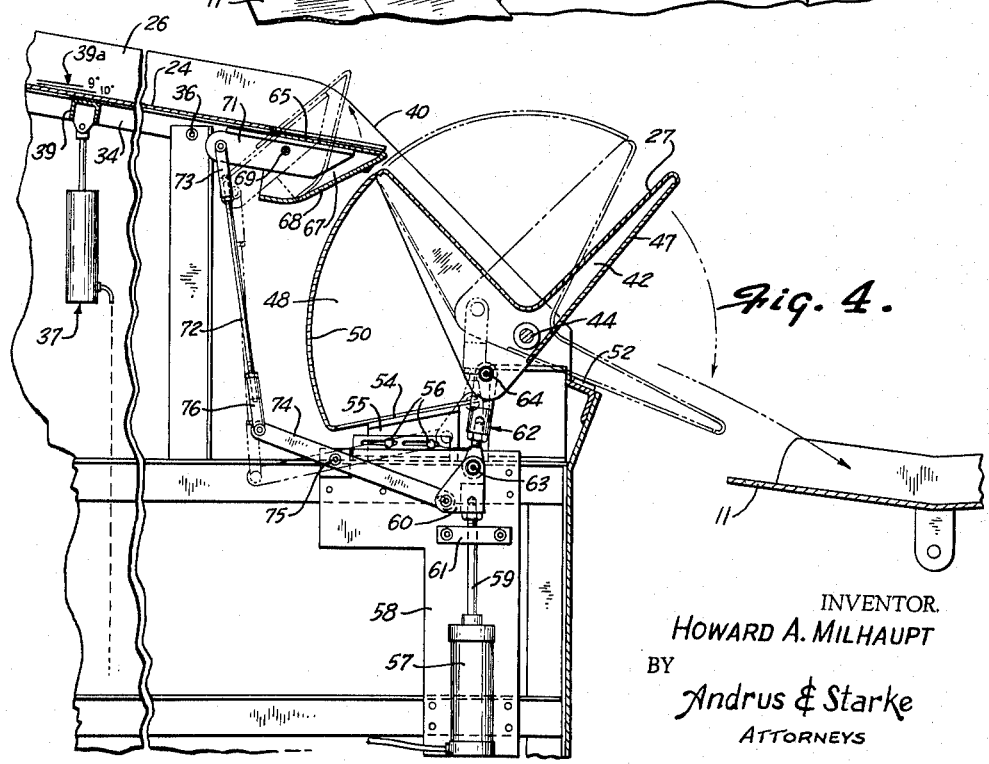
FIG. 4 is an enlarged sectional view of the orienting table shown in FIGS. 1–3.

Referring particularly to FIGS. 1 and 4, the bottom opposite edges of table 24 are secured to similar inverted L-shaped angles 34 and the lower end is pivotally secured within the side wall structures 25 and 26 as at 35 and 36, respectively. The upper end of the table 24 is supported by an angle adjusting jack 37 which is diagrammatically illustrated in FIG. 1 as a step-on type jack having a foot-operated pedal 38 on the platform 32 operatively coupled to raise and lower a supporting beam 39 upon which the upper end of table 24 rests. Any other suitable automatic or manual positioning means might of course be employed to position the table and separately and mechanical locking means might be employed to hold the table in the set position. Suitable angular indicia 39a is provided on the upper inner vertical wall of wall structure 26 for indicating the angle of the table 24. An angle of about 9 to 12 degrees for the orienting table 24 has been found to constitute a substantially neutral axis about the gravity movement of the mail bags 2 and provides an extremely satisfactory operation. For other articles of course some other angle may be required.

As a result of the proper angular positioning of the table 24, the mail bags drop onto the table 24 and generally stop but can be slid down the table with a very slight effort. Further, if a bag 2 begins to slide down under its own weight, or if the operator wishes to stop the movement of a bag once it is started, a very slight backward effort or push on any portion of the bag stops its further movement. With the bags 2 delivered directly to a slanted portion of the orienting table 24, the operator therefore never has to expend any great amount of energy and can readily move the bag 2 and control its position without any conscious effort. This concept of the invention is particularly important for rapid semi-automatic loading because the operator may concentrate on reading of the information on the tags 3 and proper operation of the keyboard 10 while moving of the bag 2 into bucket 27.

The discharge bucket 27 is povitally mounted at the discharge end of the orienting table 24 between the forward ends of the side walls 25 and 26. The upper edges are vertically offset as at 40 to expose the opposite ends of the bucket 27.

Bucket 27 is generally V-shaped and of a length to accommodate a single mail bag 2. An end wall 41 closes the end of the bucket 27 adjacent the operating platform 32. The opposite end of the bucket 27 is open such that mail bags 2 or other packages of unusual length can project outwardly therethrough.

Referring particularly to FIGS. 4 and 5, the illustrated construction of bucket 27 includes a pair of generally V-shaped central under braces 42. The lower portion of the bucket end wall 41 is similarly formed and a similarly shaped end wall 43 is secured to the open end of bucket 27. A shaft 44 extends through the braces 42 and end walls 41 and 43 immediately beneath the apex of the bucket 27 and is secured thereto as by welding or the like. Shaft 44 extends outwardly of the ends of the bucket 27 and is journaled at the opposite ends in bearings 45 and 46 mounted in the forward portions of the side walls 25 and 26. The bucket 27 is shown provided with an integral front wall 47 which serves as protective shroud.

Fan-shaped rear extensions 48 and 49 are provided on the back edges of end walls 41 and 43 of the bucket 27 and a cover plate or shroud 50 is secured to edges thereof such that when the bucket 27 is tilted to the discharge position, the plate 50 maintains the forward end of table assembly 9 closed. This eliminates the danger of accidental movement of articles or personnel into the gap left by the movement of the bucket 27.

Figure 3:
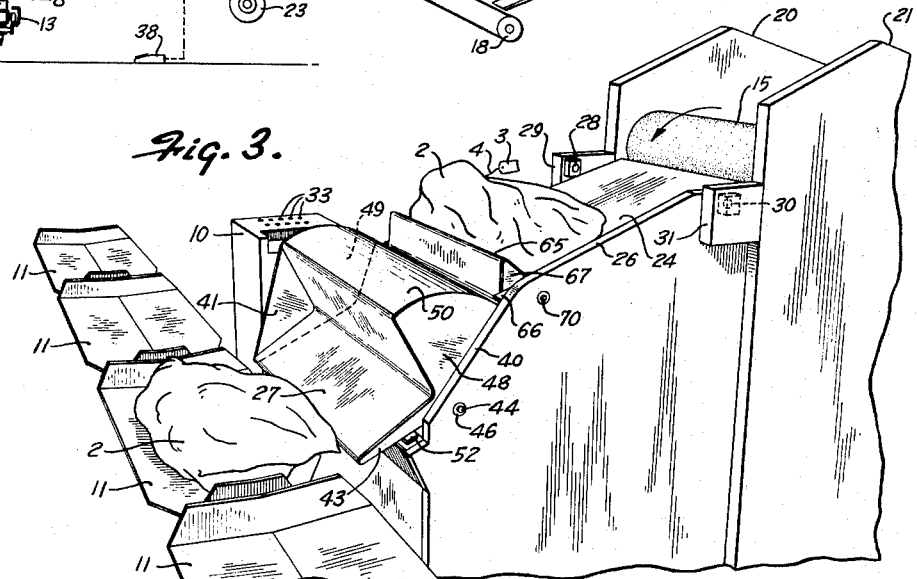
FIG. 3 is an enlarged perspective of a portion of an induction station shown in FIG. 2.

Bumper pads 51 and 52 are secured to the front of bucket 27 by a suitable brace or holder 53 in alignment with the opposite ends of the bucket. The bumper pads 51 and 52 are inclined generally in accordance with the discharge position of the front wall 47 of the bucket 27. Similarly, adjustable bumper pads 54 of which only one is shown in FIG. 3 are secured to a suitable bumper holder 55 as by bolts 56 in alignment with the inner ends of the fan-shaped extensions 48 and 49. The pumber pads 54 are positioned to adjust the loading position of the bucket 27. Bumper pads 51, 52 and 54 absorb the forces of the pivoting bucket 27, prevent undue noise and vibration of the bucket 27 and also serve to determine the limits of movement.

The bucket 27 is selectively tilted by the action of an air cylinder 57, shown in FIGS. 4 and 5, or any other suitable pivoting means. Cylinder 57 is secured beneath the bucket 27 by a suitable mounting plate 58. An operating piston rod 59 of the air cylinder 57, and which is axially moved by actuation of cylinder, projects upwardly and terminates in a clevis 60. A pillow block 61 on the mounting plate 58 guides the piston rod 59 for vertical reciprocal movement. A turn buckle unit 62 has the one and pinned as at 63 to the clevis 60 and the opposite end is pinned as at 64 to the V-shaped central braces 42 of bucket 27 generally below and somewhat rearwardly of the shaft 38.

The bucket 27 is held in a normally upwardly opening position immediately below the discharge end of the orienting table 24 such that a bag 2 may be slid downwardly off of the table and into the bucket 27. The piston rod 59 is moved upwardly to pivot the bucket 27 and the shaft 44 to the tilted discharge position and is retracted to hold the bucket 27 in the loading position. The cylinder 57 is cyclically actuated in synchronism such that the bucket 24 is tilted to drop the bag 2 onto a proper tray 11 of conveyor 8.

The cylinder 57 also operates a hinged barrier plate 65 forming a terminal end portion of the orienting table 24. The barrier plate 65 is generally a cutout section of the lower end of the orienting table 24 with continuous edge poritons 66 of table 24 immediately adjacent the opposite ends thereof.

Segmental end walls 67 are secured to the opposite ends of the barrier plate 65 and an integral front lower cover 68 presents a front wall with the barrier plate 65 in the raised position. A pivot shaft 69 extends beneath plate 65 and is secured within corresponding openings in the segmental end walls 67. The shaft 69 extends outwardly of walls 67 and is journaled in bearings 70 secured within the aligned portions of side walls 25 and 26 of the orienting table assembly 9 for pivotally supporting the barrier plate 65. When the bucket 27 is in the position to be loaded, the plate 65 is in the inclined plane of the orienting table 24. When the bucket 27 is moved to the discharge position, the barrier plate 65 is raised to an angled position, as shown in FIG. 3 and constitutes a stop preventing the movement of mail bags 2 from the inclined table 24 and into the area of the bucket 27. The plate 65 is moved in synchronism with bucket 27, as follows.

An operating arm 71 is fixed to the central underside of the barrier plate 65 and is pinned to one end of a rigid link 72 by a coupling 73. A crank arm 74 is centrally pinned as at 75 to the mounting plate 58 for cylinder 57 and is suitably coupled and pivotally pinned to the lower end of link 72 similar to the connection of arm 71 to link 72.

The opposite end of crank arm 74 is pinned to the clevis 60 for angular positioning of the arm about the pinned connection 75 in response to vertical movement of clevis 60. When the piston rod 59 moves upwardly to pivot bucket 27 to the discharge position, the crank arm 74 rotates in a counterclockwise direction, as viewed in FIG. 4, and pulls the link 72 and the attached end of the operating arm 71 down, causing the barrier plate 65 to pivot in a counterclockwise direction to the phantom line position of FIG. 4, and the full line position of FIG. 3.

In summary, the illustrated embodiment of the invention operates as follows.

The mail bags, or other commodities which are being sorted, are carried in a random fashion by the incoming feed belt 1 and discharged in an arbitrary manner to the surge or storage chute 5 for random feedings to the loading device 7. The bull-nose separator 16 insures continued separation of the bags 2 into the lower ends of the induction belts 15 without jamming of the mail bags.

The induction belts 15 pick up the bags 2 from the chute 5 and transfers them onto the entrance end of the orienting table 24 of assembly 9. The bags 2 are delivered to the orienting table 24 one at a time in accordance with the control of the drive motor 23 by operation of the photoelectric cell 28.

The angle of table 24 is set at an optimum operating angle as heretofore described and consequently the bag 2 drops onto the orienting table 24 and remains at the entrance or top end until pulled downwardly. If, for any reason, the bag 2 tends to slide downwardly, the operator may readily hold it back or it will stop upon engagement with a previously delivered bag which has been pulled down by the operator into a position for reading of the identification tag 3. The inclined table 24 thus reduces the effort and attention required to move the bags 2 while preventing uncontrolled movement down the surface.

The operator reads the information on the tag 3 and depresses a proper key 33 of keyboard 10 to actuate the conveyor 8 to automatically deliver the keyed bag 2 to the corresponding unloading station. The bag is pushed down the inclined table 24 and into the bucket 27. When a proper tray 11 is aligned with the bucket 27, the interlock between the movement of conveyor 8 and the bucket 27 automatically actuates the air cylinder 57 to tilt the bucket 27 and discharge the bag 2 onto the proper tray 11. The pivoting rate of the bucket 27 may be made sufficiently rapid to cause the back wall of the bucket to exert an outward thrust or push on the bag 2 and provide a more positive discharge thereof. Simultaneously with the pivoting of bucket 27, the barrier plate 65 is moved into the stop position and if a subsequent bag 2 has been pulled down into reading position and tends to slide excessively, it engages the raised barrier plate 65 and stops. Upon return of the bucket 27 to the loading position, the barrier plate 65 returns to the plane of the orienting table 24 and allows the next bag 2 to slide directly into the bucket 27 for delivery to the next related tray 11.

Referring to FIG. 6, a simplified diagrammatic illustration of the interlocking of the movement of discharge bucket 27 in timed relation with the movement of trays 11 as shown for clearly illustrating the operation of the illustrated embodiment of the invention. Cylinder 57 for operating bucket 27 is diagrammatically shown in FIG. 6 as a double acting cylinder which positions the piston rod 59 normally retracted and the bucket 27 in the loading position. Air lines 76 and 77 are secured to the upper and lower ends of the cylinder 57 and are selectively connected to an air pressure line 78 and to an air exhaust line 79 by a solenoid operated four-way valve 80. Air line 77, in standby, is connected to the exhaust line 79 and line 76 is connected to the air pressure line 78 by valve 80 to hold the bucket 27 in the loading position. A solenoid 81 is coupled to operate valve 80 in synchronism with the movement of trays 11 and connect the air pressure line 78 to the air input line 77 and the exhaust line 79 to line 76 whenever a proper tray 11 is aligned with the corresponding bucket 27.

The illustrated solenoid 81 is of any suitable construction and may include an adjustable means shown conventionally by an arrow 82 through the solenoid for varying the operating rate of the solenoid. The valve 80 can then be opened relatively rapidly or slowly to adjust the dumping or discharging speed of bucket 27 for controlling the discharging thrust imparted to the bag 2 in the bucket.

The solenoid 81 is connected to a suitable operating power source, not shown, such as a conventional 110 volt power line, in series with a normally open switch 83. A rotating cam 84 is mounted adjacent switch 83 and includes a small projection 85 which engages and momentarily closes the switch once during each complete cam revolution. The cam 84 is driven in timed relation with the movement of trays 11, as follows.

A main conveyor drive 86 is coupled to the chain for moving trays 11 at a constant predetermined speed. Drive 86 may be of any suitable construction and because it forms no part of the present invention is shown in block diagram. Rotating cam 84 is connected to the conveyor drive 86 by a synchronizing chain and gear drive 87 and shown driven thereby in precise timed relation to the movement of trays 11 although the movement may be timed by electrical means or other suitable means. The drive 87 includes an output shaft 88 to which cam 84 is secured by a clamping bolt 89 and a key connection 90. The projection 85 is thus located with respect to the conveyor drive 86 and the positions of the trays 11.

In the illustrated embodiment of the invention, cam 84 rotates one complete revolution in the time two trays 11 move past the corresponding bucket 27. Further, the projection 85 engages the switch 83 when a tray 11 is in predetermined alignment with the bucket 27 which is then pivoted to the discharge position to drop the bag 2 onto the tray.

The initiating of the tilting of the bucket 27 is controlled by the angular position of the projection 85 with respect to the locating key connection 90. Thus, in a very high speed sorter operation, the bucket 27 may desirably begin the tilting movement prematurely and substantially before the proper tray is aligned therewith such that when the bucket 27 is in the discharge position, a proper tray 11 has moved into precise alignment therewith for proper and desired loading. The initiating of the discharge movement of bucket 27 may be adjusted to provide the optimum locating of the article on the tray 11 by providing different cams with differently located projections or by providing means to rotate a single cam with respect to the rotational drive therefore. For example, the shaft 88 may be adjustably connected to the synchronizing drive 87 in any suitable manner.

The adjustment of the initial movement of bucket 27 is dependent upon and related to the discharging time established by the adjustment of solenoid 81. This interrelation also permits adjustment of the loading period and the discharging period within the period taken for a tray 11 to move into alignment with bucket 27. Further, if the discharging period is preset, the time allowed to read the information on tag 3 and actuate the keyboard 10 can be controlled by regulating the speed of the conveyor 8, which is separately adjusted. Thus, by increasing the speed of the conveyor 8, the loading time is decreased and conversely, by reducing the conveyor speed, the loading time is increased. The system thus permits necessary adjustment of operation in accordance with time required for accurate and reliable operation of keyboard 10.

The present invention thus provides a means for high speed loading and classification of commodities in a semi-automatic system wherein a continuous and even flow of the commodities are provided and where minimum effort is necessary on the part of the workman. The apparatus is readily adjusted to accommodate different types of commodities and is relatively simple while employing reliable components and is thus particularly adapted for commercial application.

Various modes of carrying out the invention are contemplated as being within the scope of the following claims particularly pointing out and distinctly claiming the subject matter which is regarded as the invention.

I claim:
1. Apparatus for transfer of articles, comprising
   an inclined feed chute extending downwardly and having a central divider for separating the articles at the lower end of the chute into two lines with a transfer conveyor in each of the lines,
   transfer assemblies in each of the lines to receive articles from the transfer conveyors and each of the assemblies including an adjustable pivotally mounted and downwardly inclined chute having a planar sliding surface and including means to preset the angle of the chute to prevent rapid movement of an article downwardly on the sliding surface and thereby permit manual movement of the article on the chute, barrier plates pivotally mounted one each to the lower end of the pivotally mounted chute, a bucket in each line and pivotally secured immediately below the lower end of the corresponding pivotally mounted chute and having an upwardly opening loading position in which an article slides from the chute into the bucket and a downwardly opening discharge position in which an article falls from the bucket, and a discharge operating means connected to said barrier plate and to said bucket to simultaneously position them, said discharge operating means having a first position holding the bucket in the loading position and the barrier plate in the plane of the sliding surface for transfer of the article from the chute to the bucket and a second position holding the barrier plate projecting upwardly from the lower end of the sliding surface and the bucket in the discharging position.

2. The apparatus of claim 1 wherein said buckets have a generally U-shaped cross-section and are closed at one end and open at the opposite end.

3. The apparatus of claim 1 wherein said discharge operating means include a hydraulic cylinder having an output shaft and a linkage means connected to said buckets and to said barrier plates to simultaneously pivot the bucket and plate of each line.

4. The apparatus of claim 1 wherein a conveyor means includes a conveyor drive means to move a series of platforms past the buckets of each line, and a pair of control means are provided for actuating each of the discharge operating means in each line, each control means including a first presettable means connected to the conveyor drive means for actuating the operating means in predetermined timed relation to the movement of the platforms and an adjustable means adjusts the speed of the movement of the bucket.

5. Apparatus for transfer of articles, comprising a feed chute for the articles to be transferred and having a discharge end of the chute feeding the articles to a transfer conveyor, a transfer assembly aligned with the conveyor to form a transfer line and receiving articles from the transfer conveyor and including an adjustable pivotally mounted and downwardly inclined chute having a planar sliding surface and including means to preset the angle of the chute to prevent rapid movement of an article downwardly on the sliding surface and thereby permit manual movement of the article on the chute, a barrier plate pivotally mounted to the lower end of the pivotally mounted chute, a receptacle in the line and pivotally secured immediately below the lower end of the pivotally mounted chute and having an upwardly opening loading position in which an article slides from the chute into the receptacle and a downwardly opening discharge position in which an article falls from the receptacle, and a discharge operating means connected to said barrier plate and to said receptacle to simultaneously position them, said discharge operating means having a first position holding the receptacle in the loading position and the barrier plate in the plane of the sliding surface for transfer of the article from the chute to the receptacle and a second position holding the barrier plate projecting upwardly from the lower end of the sliding surface and the bucket in the discharging position.

References Cited by the Examiner
UNITED STATES PATENTS

| | | | |
|---|---|---|---|
| 647,870 | 4/1900 | Patterson. | |
| 1,291,353 | 1/1919 | Allison. | |
| 1,700,697 | 1/1929 | Draper. | |
| 2,182,857 | 12/1939 | Steele | 214—11 |
| 2,555,602 | 6/1951 | Nutt | 198—30 X |
| 2,662,631 | 12/1953 | Kraus | 108—30 |
| 2,674,379 | 4/1954 | Gregory | 214—2.5 |
| 2,712,104 | 6/1955 | Putnam. | |
| 2,775,334 | 12/1956 | Jeremiah | 198—30 |
| 2,835,395 | 5/1958 | Curtenius | 214—130 X |
| 2,873,048 | 2/1959 | Gear | 193—32 X |
| 3,034,665 | 5/1962 | Speaker | 214—11 |
| 3,133,670 | 5/1964 | Heyer | 221—9 |

GERALD M. FORLENZA, *Primary Examiner.*

MORRIS TEMIN, HUGO O. SCHULZ, *Examiners.*